Nov. 30, 1937.    R. L. IRWINE    2,100,482
FILTER
Filed June 24, 1936    2 Sheets-Sheet 1

INVENTOR
Robert L. Irwine
BY Kenyon & Kenyon
ATTORNEYS.

Nov. 30, 1937.  R. L. IRWINE  2,100,482
FILTER
Filed June 24, 1936  2 Sheets-Sheet 2

INVENTOR
Robert L. Irwine
BY
Kenyon & Kenyon
ATTORNEYS.

Patented Nov. 30, 1937

2,100,482

UNITED STATES PATENT OFFICE 2,100,482

FILTER

Robert L. Irwine, Union, N. J., assignor to Motor Improvements, Inc., Newark, N. J., a corporation of Delaware Application June 24, 1936, Serial No. 86,943

11 Claims. (Cl. 210—167)

This invention relates to filters and more especially to a filter for removing solid particles from a liquid used as the cooling medium for grinding wheels, cutting tools and the like. In ordinary factory practice, such cooling medium is circulated through a system comprising a tank and suitable conduits for supplying the cooling medium from the tank to the tool and returning the cooling medium from the tool to the tank. The cooling medium becomes contaminated with solid particles cut by the tool from the work upon which it is operating and the presence of such solid particles in the cooling medium is highly undesirable for certain types of manufacturing operations.

An object of this invention is a self-cleaning filter, particularly adapted to remove solid particles from the cooling medium used with certain types of cutting machines which will operate efficiently without attention for long periods.

In a filter embodying the invention, a tubular filtering element, preferably of the metal ribbon type disclosed in the patent to Liddell, No. 2,042,537 is caused to rotate in the cooling medium tank and cooling medium is sucked in through the interstices of the element, solid particles being removed from the cooling medium and being collected on the outer surface of the filtering element. The major portion of the filtered cooling medium is delivered to the tool to be cooled, but a portion of the cooling medium is caused to flow reversely through the rotating filtering element in a thin stream extending from one end of the element to the other. Thus, a layer or coat of filtrate is prevented from forming on the outer surface of the element as during each rotation of the filtering element, a stream of filtered liquid removes deposited filtrate from the entire outer surface of the filter element. Preferably, the cooling medium is sucked in through the filter element and delivered to the tool by an impeller located within the filtering element and the stream of filtered cooling medium is used to effect rotation of the filter element.

Other objects, novel features and advantages of this invention will become apparent from the following description and accompanying drawings, wherein.

Figure 2:
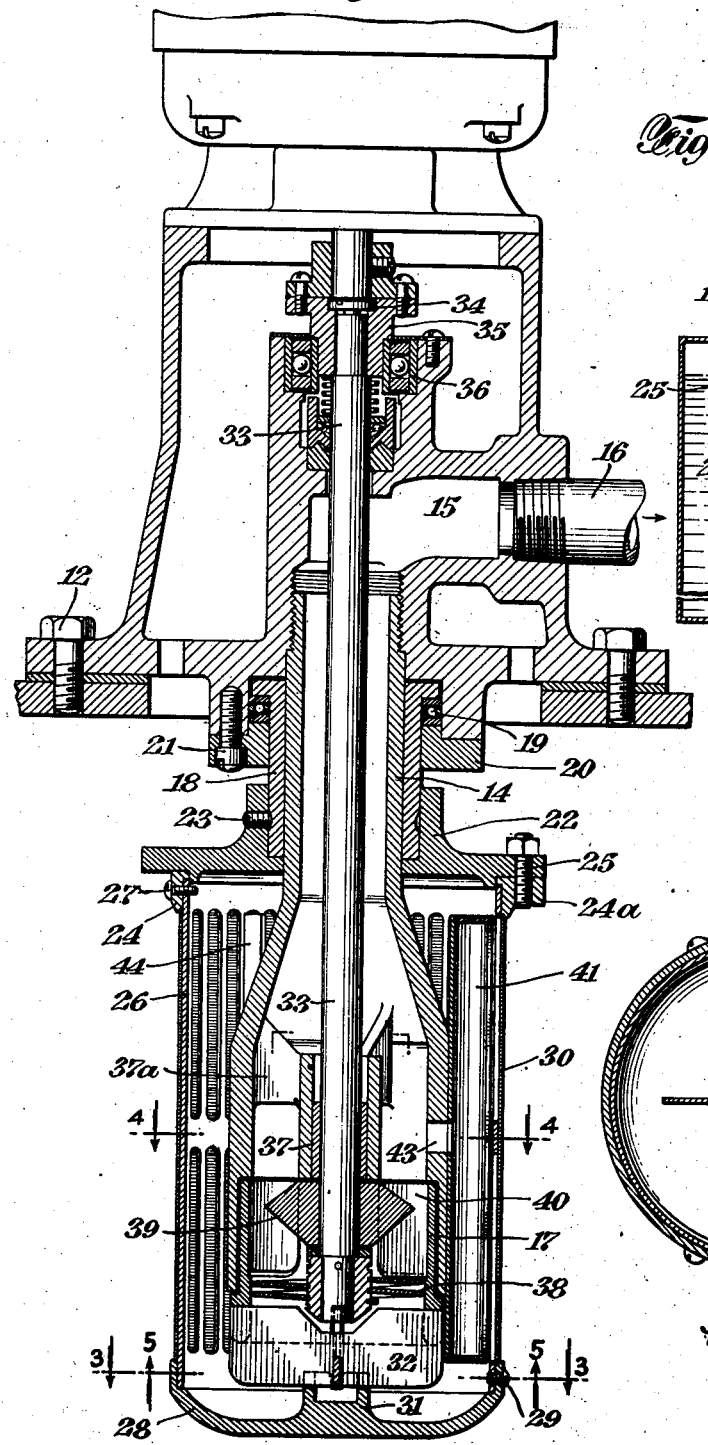
Fig. 2 is a vertical section through a filter embodying the invention.
Figure 1:
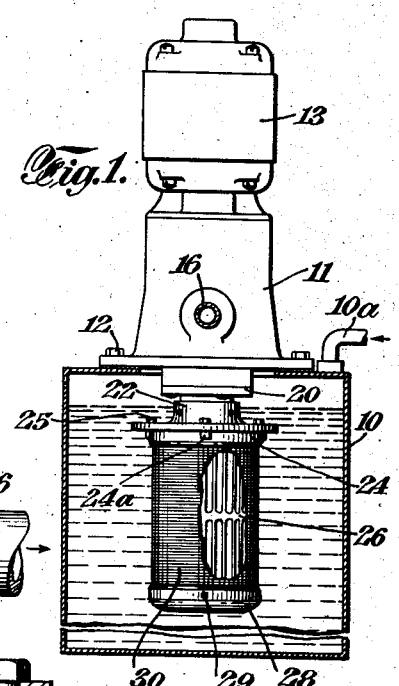
Fig. 1 is a side elevation of a filter embodying the invention assembled with a tank, the latter being shown in vertical section.
Figure 3:
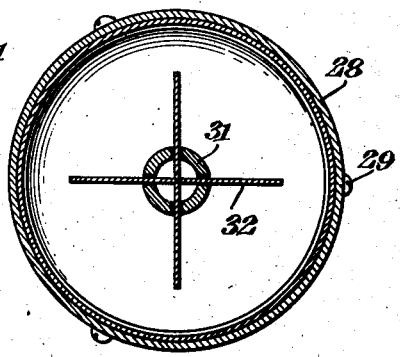
Fig. 3 is a section on the line 3—3 of Fig. 2.
Figure 4:
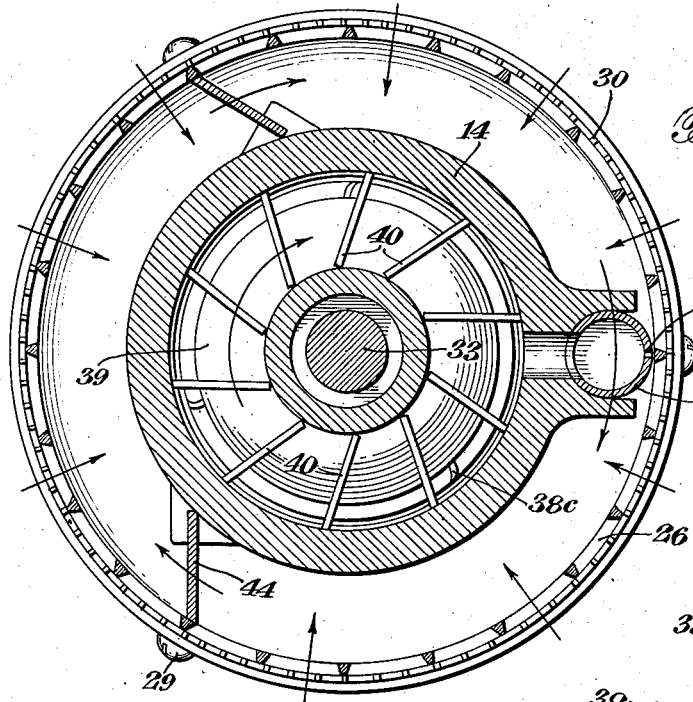
Fig. 4 is a section on the line 4—4 of Fig. 2.
Figure 6:
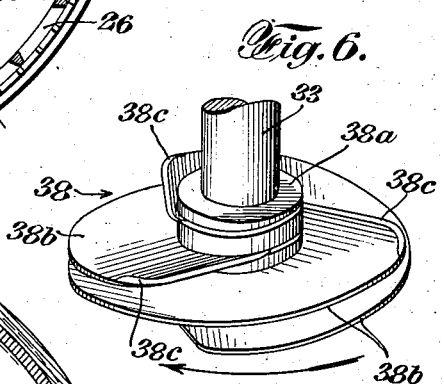
Fig. 6 is a perspective view of the impeller.
Figure 5:
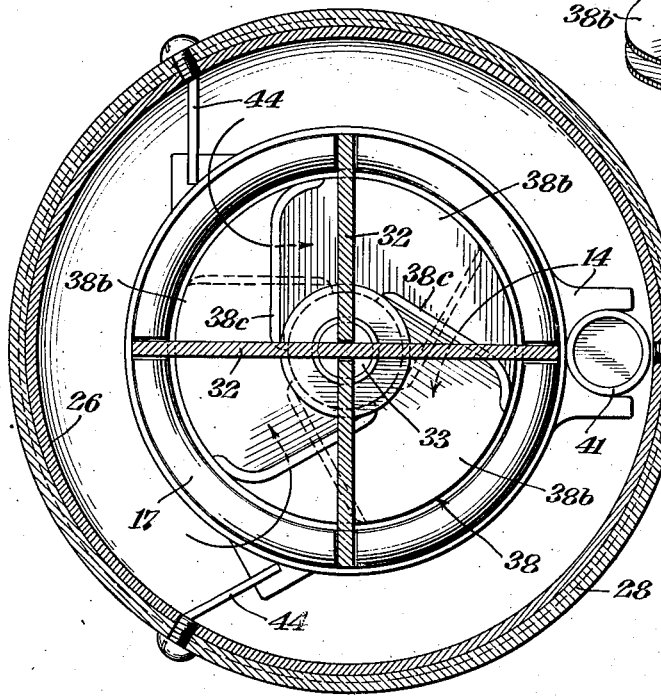
Fig. 5 is a section on the line 5—5 of Fig. 2.

Any suitable tank 10 may be used to contain a supply of cooling medium and is provided with flanges, cross-bars or the like on which is mounted a cored head 11, the head being attached to the tank by bolts 12 or other suitable means. A motor 13 is mounted on the upper end of the head 11 in any suitable manner.

A tubular housing 14 has its upper end threaded into the lower end of a passageway 15 formed in the head 11 and in the other end of the passageway 15 is threaded one end of a pipe 16. The lower end of the housing 14 is of greater diameter than the upper end and in it is rotatably arranged a sleeve 17. A second sleeve 18 surrounds the upper end of the housing 14 and is journalled in the head 11 by a suitable ball-bearing 19 which is assembled with the head 11 by means of a bushing 20 provided with attaching bolts 21. A collar 22 is attached to the lower end of the sleeve 18 by screws 23.

A ring 24 is attached to the collar 22 by bolts 25 passing through ears 24a on the ring 24 and the flange portion of the collar. A cylindrical frame 26 is attached at its upper end to the ring 24 by screws 27 and is attached at its lower end to a cap 28 by screws 29. The frame 26 is provided with a large number of elongated apertures over its major portion and is enclosed by a cylindrical filtering element 30. The filtering element 30 comprises a helix of metal ribbon having contacting turns and being provided with spacing means to provide filtering interstices, such filtering element being fully disclosed and claimed in the aforementioned patent to Liddell, No. 2,042,537. The ends of the filtering element are received in grooves formed by the ends of the frame 26 with the ring 24 and cap 28.

The cap 28 is provided with a boss 31 equipped with cross grooves in which are received the bottom edges of a cross-shaped metal member 32, the upper edges of which fit in cross cuts in the bottom edge of the sleeve 17. A shaft 33 is attached at its upper end by a screw 34 to a head 35 which is journalled in the head 11 by a ball-bearing 36. The lower end of the shaft 33 is journalled in a bearing 37 provided near the lower end of the housing, this bearing being supported by arms 37a projecting inwardly from the inner periphery of the casing. A three-blade impeller 38 is attached to the lower end of the shaft 33. A hub 39 is rotatably mounted on the shaft 33 between the impeller 38 and the bearing 37. The hub 39 has top and bottom conical faces, the angularity of the top face being greater than that of the bottom face. Blades 40 are mounted in slots cut in the hub in angular relation to radii and impinge the inner periphery of the sleeve 17 so that the latter rotates with the hub 39. A tube 41 is attached to the outer periphery of the housing 14 and is of substantially the same length as the filter element 30. The tube 41 is slotted along a line parallel to the axis of the filtering element and is so arranged as to discharge liquid from the tube into contact with the inner periphery of the filtering element 30 along a line extending from one end to the other of the filtering element. The tube 41 is in connection with the interior of the housing 14 through the medium of a passageway 43 extending through the wall of the housing and the wall of the tube.

In the operation of the apparatus just described, the motor 13 which is suitably connected to the upper end of the shaft 33 rotates the impeller 38 at a relatively high speed. The impeller sucks liquid through the interstices of the filter element 30 into the bottom of the housing and drives such liquid under pressure through the passageway 15 into the pipe 16 and through the same to the tool to be cooled. The stream of filtered liquid flows through the passageways formed in the sleeve 17 by the vanes 40, causing rotation thereof at a much slower rate than the rotation of the impeller 38. The cap 28 is caused to rotate with the sleeve 17 through the medium of the cross-shaped member 32 with the consequent rotation of the entire filtering element and its supporting structure. A portion of the filtered liquid is directed through the passageway 43 into the tube 41 from which it is discharged through the slot 42 against the inner periphery of the filtering element 30. The force of the stream discharged through the slot 42 is sufficient to cause reverse flow through the filtering element thereby dislodging any filtrate that may have been deposited thereon. Rotation of the filtering element causes such action to be spread over the entire surface of the filtering element with the result that it is continuously maintained clean. Liquid from the tool is returned to the tank 10 through the pipe 10a. Vertical fins 44 are provided for preventing swirling of the liquid within the filtering element, the tube 41 also serving in the same respect.

The impeller 38 consists of a hub 38a having three spiral grooves. In each of these grooves is arranged an arcuate plate 38b, the plates being so oriented with respect to each other that their leading edges are approximately 120° apart and lie in the same plane perpendicular to the axis of rotation. The trailing edges are arranged in the same space relation and are provided with up-turned edges 38c.

I claim:

1. A self-cleaning filter comprising a tubular rotatable filtering element, rotary pump means within said filtering element and having its inlet communicating with the interior of said filtering element, a discharge passage for filtered liquid, a distributor for directing a thin stream of liquid against the inner surface of said filtering element from one end to the other thereof, said pump means having its outlet communicating both with said discharge passage and said distributor, means for driving said pump means for sucking liquid through said filtering element and supplying a portion thereof under pressure to said distributor, and means associated with said pump for rotating said filtering element.

2. A self-cleaning filter according to claim 1 in which the distributor comprises a tube within said filtering element extending parallel to the axis thereof and being apertured along a line parallel to the tube axis.

3. A self-cleaning filter comprising a tubular rotatable filtering element, a stationary housing within said filtering element, a tube carried by said housing and being apertured along a line extending from one end to the other, an impeller in said housing, means to rotate said impeller to suck liquid through said filtering element and supply filtered liquid to said housing, a rotatable element in said housing driven by liquid discharged by said impeller, and connections between said rotary element and filter element for effecting rotation of the latter by the former.

4. A self-cleaning filter comprising a stationary tubular housing, a rotatable tubular filter element enclosing said housing, a shaft journalled in said housing, an impeller mounted on said shaft, a rotatable element journalled in said housing in position to be driven by liquid discharged by said impeller, and a tube communicating with said housing, said tube extending parallel to the axis of said filtering element and being apertured along a line parallel to its own axis, said impeller being effective upon rotation to suck liquid through said filter element and discharge it through said rotatable member, a portion of the fluid being passed into said tube and projected in a thin stream against the interior surface of said filter element.

5. A filter comprising a head, a cylindrical filtering element rotatably supported thereby, a tubular housing carried by said head and extending into said filtering element, said head having a passageway communicating with said housing, pump means in said housing for sucking liquid through said filtering element and discharging the same through said housing into said passageway, a rotatable member in said housing operable by liquid discharged from said pump means, and means connecting said rotary member and filtering element for effecting rotation of the latter by the former.

6. A filter according to claim 5 wherein means are provided for projecting liquid against the inner surface of said filtering element, said means being in communication with said housing.

7. A filter comprising a head, a cylindrical filtering element rotatably supported thereby, a tubular casing carried by said head and extending into said filtering element, said head having a passageway communicating with said housing, a shaft journalled in said housing, an impeller fixed to said shaft and effective upon rotation to suck liquid through said filtering element and discharge the same through said housing into said passageway, a sleeve rotatable in said housing and having passageways through which liquid is discharged from said impeller to effect rotation of said sleeve, and means connecting said sleeve and filtering element for effecting rotation of the latter by the former.

8. A filter according to claim 7 in which a tube communicating with the interior of said housing is supported by said housing, said tube being apertured to project liquid therefrom against the inner surface of said filtering element.

9. A filter comprising a head, a cylindrical filtering element rotatably supported thereby, a tubular housing carried by said head and extending into said filtering element, said head having a passageway communicating with said housing, a shaft journalled in said housing, an impeller fixed to said shaft and effective upon rotation to suck in liquid through said filtering element and discharge the same through said housing into said passageway, a rotatable element in said housing operable by liquid discharged by said impeller, and connections between said rotatable element and filtering element for effecting rotation of the latter by the former.

10. A filter according to claim 9 wherein means are provided for diverting liquid from said housing into contact with the inner surface of said filtering element.

11. A self-cleaning filter comprising a tubular rotating filtering element, pump means within said filtering element and having its inlet communicating with the interior of said filtering element, means for operating said pump means to suck liquid through said filtering element, a passage into which said pump discharges, means within said filtering element and operable by liquid discharged from said pump means for effecting rotation of said filtering element, and means for diverting a portion of the liquid discharged from said pump into contact with the inner surface of said filtering element.

ROBERT L. IRWINE.